(12) United States Patent
Giakos

(10) Patent No.: US 6,804,041 B1
(45) Date of Patent: Oct. 12, 2004

(54) PHOTONIC PROCESSORS AND OPTICAL GUIDING STRUCTURES FOR LIGHTWAVE APPLICATIONS, SYSTEMS, AND TECHNIQUES

(75) Inventor: George C. Giakos, Fairlawn, OH (US)

(73) Assignee: The University of Akron, Akron, OH (US)

( * ) Notice: Subject to any disclaimer, the term of this patent is extended or adjusted under 35 U.S.C. 154(b) by 153 days.

(21) Appl. No.: 10/457,287

(22) Filed: Jun. 9, 2003

(51) Int. Cl.[7] .......................... G02B 26/00; G02B 3/12; G09G 3/38
(52) U.S. Cl. .................... 359/296; 359/667; 345/105; 345/107
(58) Field of Search .................... 359/296, 666, 359/667; 345/105, 107, 84, 85; 252/572

(56) References Cited

U.S. PATENT DOCUMENTS

| | | | |
|---|---|---|---|
| 3,355,235 A | 11/1967 | Berreman | 359/655 |
| 3,390,932 A | 7/1968 | McAfee, Jr. | 385/125 |
| 3,390,934 A | 7/1968 | Berreman | 359/655 |
| 3,399,942 A | 9/1968 | Berreman | 359/667 |
| 3,400,993 A | 9/1968 | Beck et al. | 359/655 |
| 3,410,627 A | 11/1968 | Berreman et al. | 359/655 |
| 3,410,628 A | 11/1968 | Conklin | 359/655 |
| 3,415,588 A | 12/1968 | Berreman | 385/125 |
| 3,494,687 A | 2/1970 | Weiner | 359/665 |
| 3,652,150 A | 3/1972 | Berreman | 359/667 |
| 4,331,388 A | 5/1982 | McCrobie et al. | 359/666 |
| 4,582,398 A | 4/1986 | Roberts et al. | 359/667 |
| 4,721,370 A | 1/1988 | Goede | 359/667 |
| 4,732,458 A | 3/1988 | Zambelli | 359/666 |
| 4,740,062 A | 4/1988 | Rodriguez | 359/667 |
| 4,758,072 A | 7/1988 | Harrigan | 359/666 |
| 5,280,169 A * | 1/1994 | Honey et al. | 359/296 |
| 5,682,268 A | 10/1997 | Michaelis | 359/667 |
| 2003/0123127 A1 * | 7/2003 | Yamamoto et al. | 359/296 |

OTHER PUBLICATIONS

*Optical Properties of Fiber Tapers and Their Impact on the Performance of a Fiberoptically Coupled CCD X-Ray Imaging System*, Hong Liu, Andrew Karellas, Lisa Harris and Carl D'Orsi, Proceedings of Clinical Applications of Modern Imaging Technology, vol. 1894, pp. 136–147, A. Wist, Editor, SPIE Publications, 1993.

*IR-Diaphanoscopy in Medicine*, J. Beuthan, O. Minet, G. Muller and V. Prapavat, Medical Optical Tomography: Functional Imaging and Monitoring, pp. 263–282, G. Muller, Editor, SPIE Publications, 1993.

*Visible and Infrared Diaphanoscopy for Medical Diagnosis*, Yutaka Yamashita and Masao Kaneko, Medical Optical Tomography: Functional Imaging and Monitoring, pp. 283–316, G. Muller, Editor, SPIE Publications, 1993.

*Key Paradigms of Emerging Imaging Sensor Technologies*, George C. Giakos, IEEE Transactions on Instrumentation and Measurement, vol. 47, No. 6, pp.3–11, Dec. 1998.

* cited by examiner

Primary Examiner—Georgia Epps
Assistant Examiner—M. Hasan
(74) Attorney, Agent, or Firm—Roetzel & Andress

(57) ABSTRACT

A light processing cell and method for lightwave applications is disclosed. The cell comprises at least one gas medium; an enclosure for containment of the gas medium, the enclosure allowing light transmission through the gas medium; and polar molecules dispersed within the gas medium and comprising electric dipoles that align to the direction of an electric field applied to the cell. The polar molecules contribute to the local electric field and effective dielectric constant and contribute to establish a relatively high local electric field by which to focus light transmitted through the cell.

14 Claims, 6 Drawing Sheets

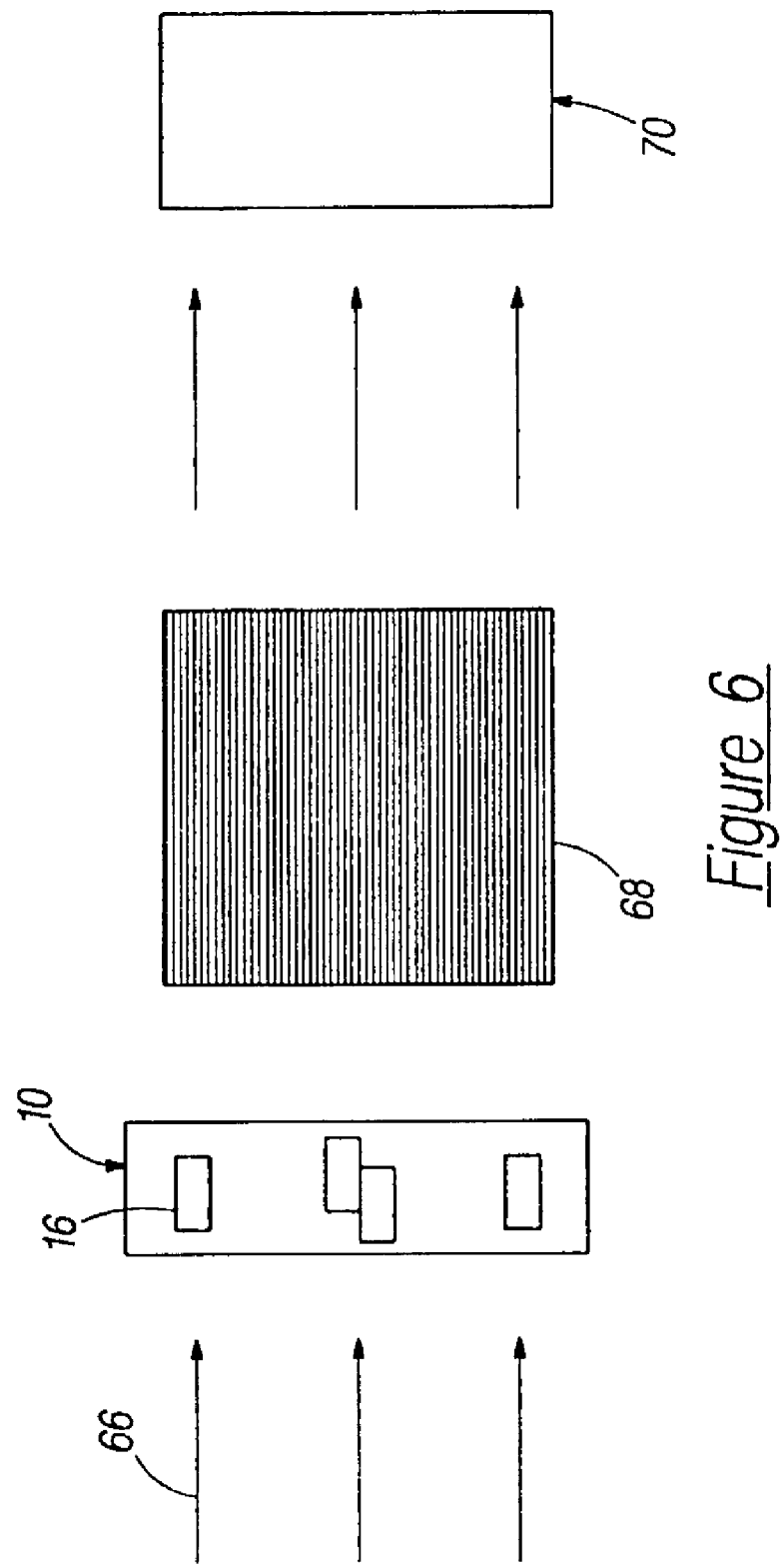

PHOTONIC PROCESSORS AND OPTICAL GUIDING STRUCTURES FOR LIGHTWAVE APPLICATIONS, SYSTEMS, AND TECHNIQUES

TECHNICAL FIELD

The present invention relates generally to the transmission of electromagnetic waves and, more specifically, to a new class of light processors and guiding structures having enhanced light transmission, modulation, and processing capabilities.

BACKGROUND OF THE INVENTION

The development and utilization of optics for focusing radiation in imaging and communications systems is essential. Numerous imaging and communications systems include means for generating and utilizing highly directive and intense beams of substantially coherent, high frequency, electromagnetic wave energy in the visible light and adjacent energy bands. In view of the high frequencies of such waves and the broad frequency range over which they are operative, a need exists for means for limiting the spreading of the beam between source and receiver, and thereby minimizing attenuation in energy received at the receiving station.

Solid lens designs are utilized in conventional imaging and communications systems to focus light between a transmitting radiation source and a detector whereby input having relatively wide line spread function is focused by the lens into an output beam of light having a relatively narrower line spread function. The output light may then be directed to a recording device and thereafter processed by suitable electronics into an image or display. Lenses in conventional solid state imaging systems are formed of material demonstrating desired optical properties. Such solid-state lenses can either comprise a discrete lens element or a bundle of optical fibers arranged to collect input light and focus the light into a focused beam to be processed as described above.

The use of solid lenses or bundles or optical fibers for the purpose of focusing a beam of electromagnetic radiation has not proven entirely satisfactory because of the substantial attenuation that results from even the highest optical quality lenses or fibers; attenuation that results from even the highest optical quality lenses or fibers; attenuation resulting from impurities or defects in the lens or fibers or from unavoidable losses at the surface interface due to reflection. The bending o light rays essentially requires establishing a refractive-index gradient transverse to the path of radiation. Due to surface scattering at the lens surface, or fiber bundle, interface and at any refractive-index variant boundaries within the lens, conventional solid lenses or fiber bundles result in an unacceptably high attenuation level and a relatively low signal to noise ratio.

In order to obviate the performance limitation so solid lens or fiber optic bundle configurations, gas lens designs have been proposed and utilized in systems for focusing radiation. Gas lenses may use a thermal gradient to create a suitable index of refraction and thereby narrowly focus the input beam. An alternative approach in known lens devices is to achieve a lensing effect by the creation of density gradients in a gas or gases, whereby creating layers of gas having different indices of refraction. U.S. Pat. No. 4,582,398 discloses one such gas lens configuration. The gas lens disclosed in the '398 patent provides a gradually changing index of refraction rather than the stepped gradient index of refraction when solid optics are employed. U.S. Pat. No. 4,740,062 shows yet another alternative known gas lens utilizing multiple jets of gas, each gas having a different index of refraction. The enclosure containing the gas jets is positioned to intercept a light beam that passes through the enclosure and directs the input beam through the gas jet interfaces to achieve the intended convergence of the beam While the gas lens designs discussed above work will and represent a viable alternative to solid optics, certain shortcomings attend their use. First, deployment of such a system requires relatively large volumes of gas in order to achieve the dynamic jet streams required to lens input radiation. Secondly, the containment system of the lens is relatively complex, bulky, expensive to manufacture, and difficult to maintain in proper adjustment in order to function as intended. In addition, while capable of transmitting large amounts of radiation, such gas lenses are relatively weak and prove inadequate for many applications.

U.S. Pat. No. 5,682,268 discloses yet another variation in a gas lens comprising apparatus for focusing a beam of electromagnetic radiation. The device creates spark gaps disposed within a space through which radiation passes. Shock waves produced by the electric discharges in a gaseous medium at the spark gaps interact to form a localized region of high pressure in the gaseous medium centered on the optical axis of the beam of electromagnetic radiation. The gaseous medium thus is caused to have a density profile capable of bringing the beam of electromagnetic radiation to a focus. A cylindrical chamber conlines the shock waves and includes co-axial apertures that allow the passage of the electromagnetic radiation through the chamber.

The above device alters the density of the gaseous medium to alter the optical properties thereof. While, in theory, the shock waves caused by electrical discharges can achieve a desired density variation, controlling the precise density of the gaseous medium can prove problematic in achieving a practical light processing system.

It has further been proposed to vary the pressure of a gas within a lens assembly in order to adjust the focal length of the lens to the value required. U.S. Pat. Nos. 4,732,485; 4,758,072; and 4,331,388 disclose such lens configurations. While working well, the lens assemblies are relatively complex and remain dependent on the performance and quality of the solid state lens elements of the assembly to achieve acceptable performance.

SUMMARY OF THE INVENTION

It is, therefore, an object of the invention to provide a new class of light processors and optical guiding structures for lightwave applications.

It is another object to provide a new class of light processors and optical guiding structures having enhanced focusing properties.

It is a further object of the invention to provide a class of lenses for electromagnetic radiation having a novel lens media.

Yet a further object of the invention is to provide a class of light processors and optical guiding structures that provide a low level of blurring and a higher signal to noise ratio for enhanced performance in imaging applications.

Another object of the invention is to provide a class of light processors and optical guiding structures capable of providing a relatively high signal to noise ratio for increased bandwidth for communications applications, at variable wavelength response.

Still a further object of the invention is to provide a class of light processors and optical guiding structures capable to modulate, amplify, process, shape, focus, direct, route, polarization-control, or switch an incident light beam.

Still a further object of the invention is to provide a class of lenses for electromagnetic radiation having a novel lens media that may be readily varied to achieve an optimal focal length.

These and other objects of the present invention, as well as the advantages thereof over existing prior art electromagnetic radiation lenses, which will become apparent from the description to follow, are accomplished by the improvements hereinafter described.

In general, the present invention provides light processors and optical guiding structures that can be operated at low or high pressures with and without an applied electric field, dopants, or gas mixtures. If no applied field is utilized, the gas cell operates in the passive mode. Increasing or decreasing the concentration of dopants and the gas pressure within the cell changes the index of refraction and the transmission/frequency response properties of the structure. In order to optimize the performance of the cell, the gas cell may be embedded with polar molecules or other impurities. The use of different dopants, gas mixtures, or impurities as a transmission media, all with different indexes of refraction, will allow transmission of light through reflections, blocking also certain wavelengths. In the active mode of operation, an electric field may be applied across the gas cell. Upon application of the electric field, the dipole moment of the polar molecules will align to the direction of the electric field and will increase the local electric field. Light incident on the lens system will couple to the local electric field created by the polar molecules and enhanced focusing will result. Consequently, when utilized in imaging applications, less blurring and a high signal to noise ratio results. In communications applications, the higher signal to noise ratio translates into increased bandwidth. The dipole constituent of the gas cell may be achieved by polar gas molecular dopants, impurities, gas mixture, or a polar primary gas within the cell may be utilized. The composition and physical parameters of the gas may be changed so as to optimize the focal length of the lens and its frequency response.

According to a further aspect of the invention, a method of processing light for lightwave applications is disclosed comprising the steps of interposing a gas cell in a path followed by the light, the cell having an enclosure composed of substantially transparent material, a gas medium contained within the enclosure, and polar molecules/impurities/gas mixtures dispersed within the gas medium; applying an electric field across the gas cell; and aligning the polar molecules to the direction of the applied electric field to contribute to an effective dielectric constant. In order to further optimize the system, the pressure of the gas medium may be varied to change its effective index of refraction.

A preferred exemplary embodiment and method incorporating the concepts of the present invention is shown by way of example in the accompanying drawings without attempting to show all the various forms and modifications in which the invention might be embodied, the invention being measured by the appended claims and not by the details of the specification.

BRIEF DESCRIPTION OF THE DRAWINGS

FIG. 6 is a schematic diagram of the subject lens in a communication system configuration.

DETAILED DESCRIPTION OF THE INVENTION

Figure 1:
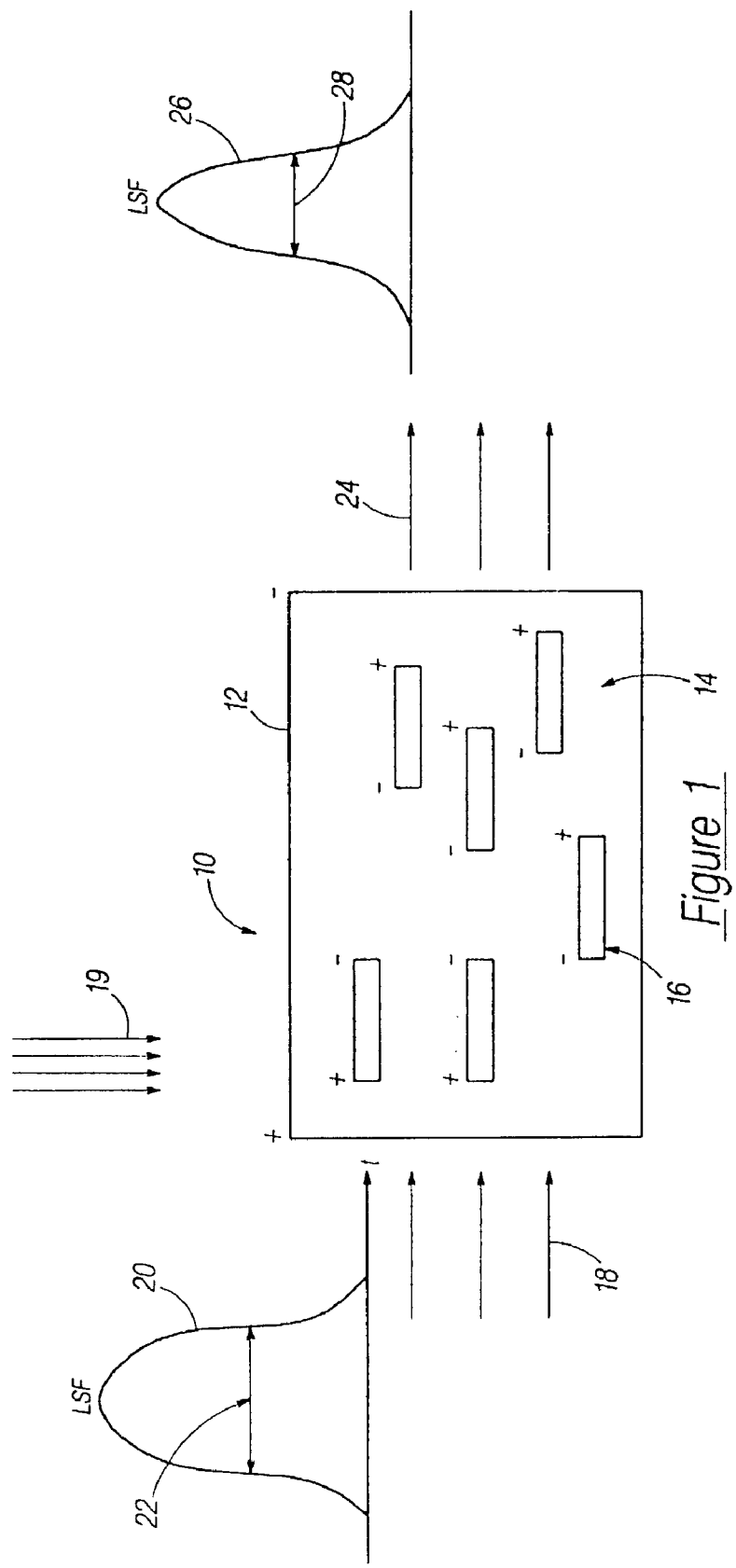
FIG. 1 is a schematic diagram of the subject electromagnetic lens.

Referring to FIG. 1, an electromagnetic lens 10 is shown comprising a containment enclosure 12 composed of a transparent material such as glass. A gas medium 14 is contained within enclosure 12 and polar molecules 16, in the subject embodiment of the invention, are dispersed within the gas 14. Alternatively, the gas medium 14 within the lens cell 10 may itself be a polar gas such as ammonia or dimethylether or others. The previous list is presented as only representative of some polar gas elements that may be used; other polar gas compositions may be substituted and utilized if so desired. In the configuration shown in FIG. 1, the gas medium 14 is nonpolar, and transparent. Polar dopants 16 are added as shown. Dopants 16 may be selected from a number of suitable elements. By way of example, without representing an exhaustive list, dopant elements ammonia, dimethylether may be incorporated within a transparent gas medium such as nitrogen, argon, krypton.

The molecules of a dielectric may be classified as either polar or nonpolar. Symmetrical molecules like $H_2$, $N_2$, and $O_2$ are nonpolar. In the molecules $N_2O$ and $H_2O$, on the other hand, both nitrogen atoms or both hydrogen atoms lie on the same side of the oxygen atom. These molecules are asymmetrical, and hence polar, and each is a small electric dipole.

When a dielectric consists of polar molecules or permanent dipoles, these dipoles are oriented at random when no electric field is present. When an electric field is present, as in FIG. 1, the forces on a dipole give rise to a couple whose effect is to orient the dipole in the same direction as the field. The stronger the field, the greater is the aligning effect.

Electric dipoles aligned to the direction of the applied electric field contribute to the total displacement, and thus to an effective dielectric constant. Due to the high local electric field, enhanced light focusing properties are achieved. Input light 18, having a line spread function (LSF) 20 of width 22 is directed into gas cell 10 from a suitable source such as a laser or LED. The high local electric field causes the light to focus into an output beam 24 having an LSF 26 of focused width 28. Alternatively, if desired, light 19 may be directed along a path transverse to the gas cell 10 in order to achieve alternate processing or shaping of the beam.

By changing the gas composition, gas mixtures, pressure, applied bias of the electric field, and other physical parameters of the cell 10, the focal length of the lens can be changed and desired focusing properties can be achieved.

Figure 2:
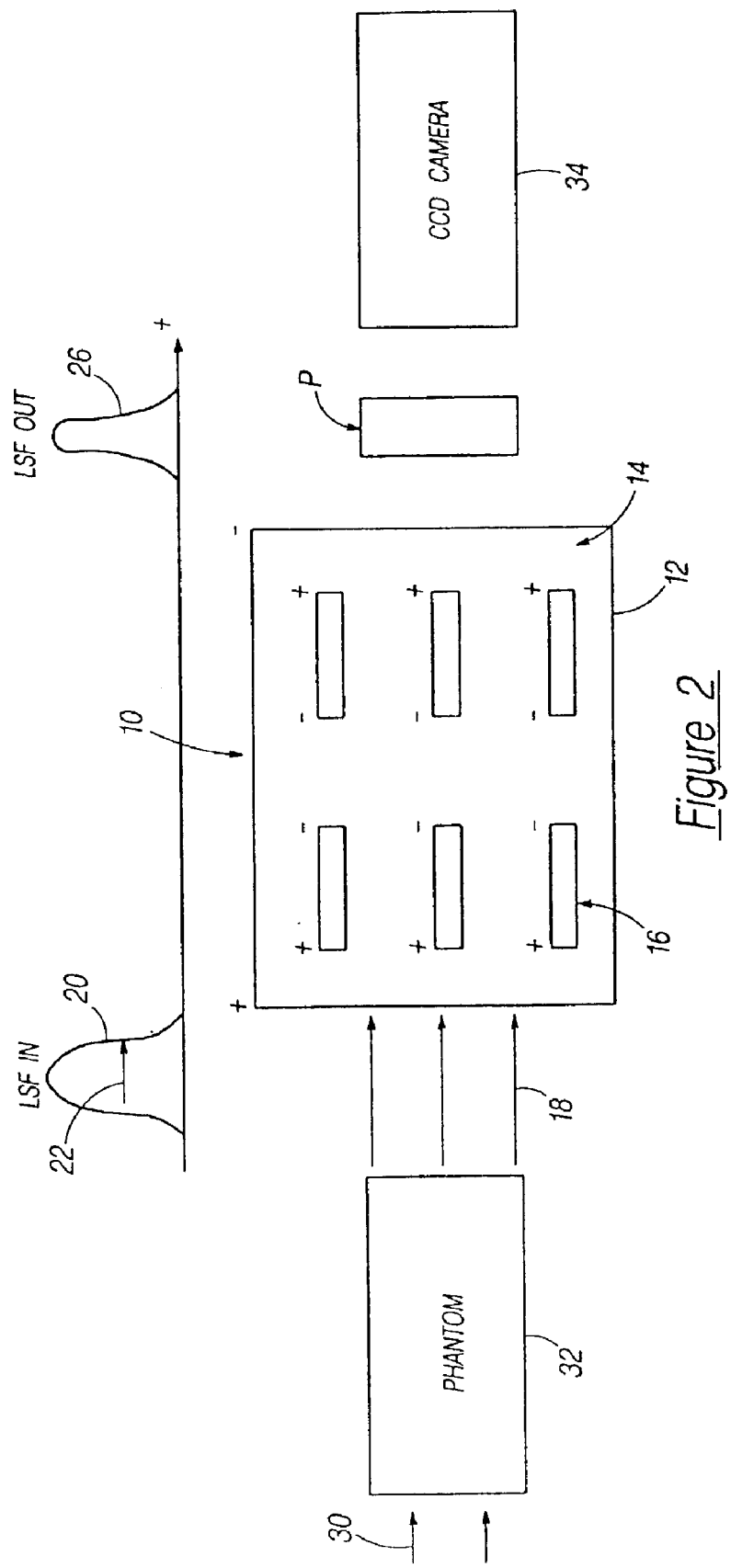
FIG. 2 is a schematic diagram of an imaging system incorporating the subject lens therein.

FIG. 2 illustrates the incorporation of the subject gas lens in an imaging system. The system, utilizing a light source 30, can be operated for area imaging or under scanning geometry (light source utilized to scan the object), or as in a confocal microscope, represented at 32. The electromagnetic lens, in the embodiment of FIG. 2, is embedded with polar molecules 16. Upon the application of an electric field, the dipole moment of the polar molecules will align to the direction of the electric field and will increase the local electric field. Light incident to the lens 10 is thereby processed into an output beam and directed to a CCD camera 34 or other optical recording device. The imaging system shown in FIG. 1 thus operates to gather and focus light having a relatively wide LSF 20 into output light having a narrowed LSF 26. Less blurring and a higher signal to noise ratio with increased bandwidth will result.

Figure 3:
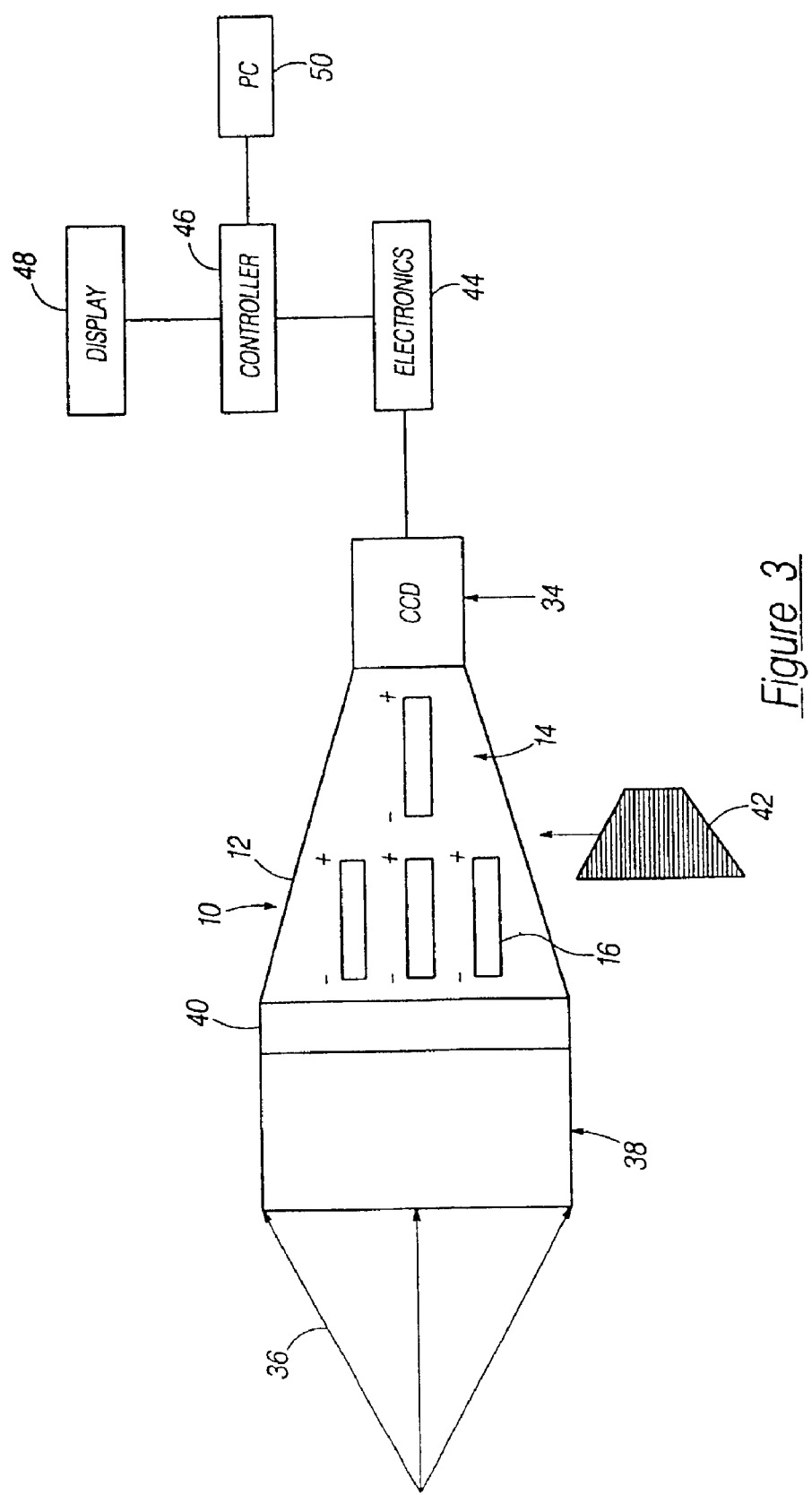
FIG. 3 is a schematic diagram of an x-ray imaging system incorporating the subject lens therein.

FIG. 3 illustrates the incorporation of the subject lens 10 into an x-ray digital imaging system and compares the system with a conventional system configuration. In conventional systems, x-rays 36 incident to phantom 38 pass through an intensifying screen 40 and are focused by a bundle of optical fibers 42 to a CCD camera 34 or other recording device. The registry of x-rays by the CCD camera 34 is processed by suitable electronics 44 and displayed at 48 under the control of controller 46 and computer 50. The bundle of fiber optics 42, however, for the reasons explained above, is less than an ideal mechanism for achieving focused delivery of the x-rays to device 34 due to surface loss, scattering, and optical defects within the fibers of bundle 42.

In FIG. 3 the lens 10 is substituted for the fiber optics 42 and an electric field is applied to orient the dipole molecules 16 as shown. Upon the application of an electric field, the dipole moment of the polar molecules will align to the direction of the electric field and will increase the local electric field. X-rays incident to the lens 10 are thereby processed into an output beam and directed to a CCD camera 34 or other optical recording device. It will be appreciated by those skilled in the art that the subject lens 10 has utility in many diverse applications. Among those are x-ray mammography; industrial imaging; aerospace, x-ray microscopy; tomography; microtomography; and confocal microscopy. The imaging capabilities of the lens 10 can, as described above, can be adjusted by varying the gas composition and physical parameters of the system, such as the strength of the applied electric field, and/or the level of dopants imbedded with the gas.

Figure 4:
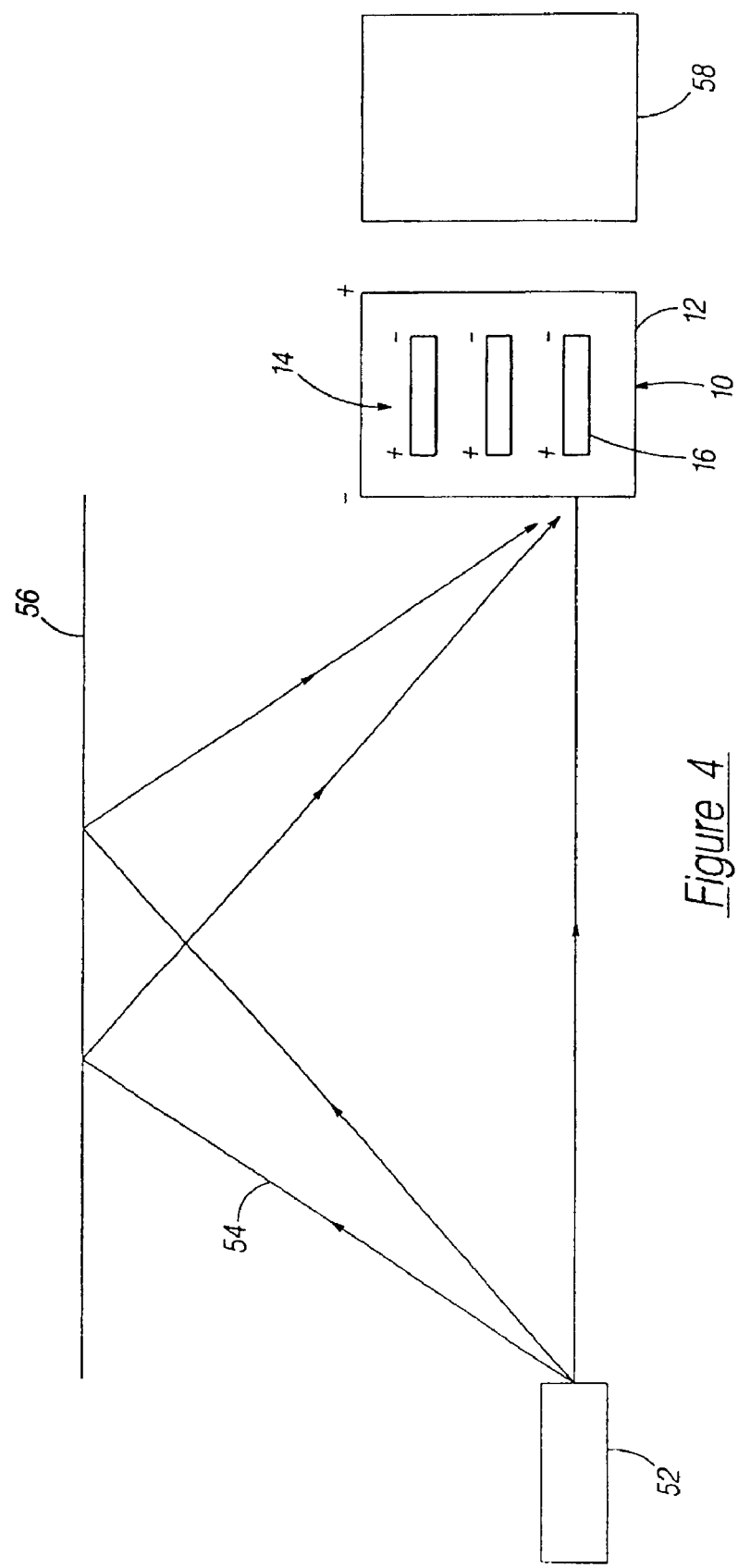
FIG. 4 is a schematic diagram of a transmission system in which the subject lens is a component.

FIG. 4 illustrates a typical optical communication system in which the subject electromagnetic lens finds application. A transmitter 52 emits an optical signal 54 along a waveguide 56 that directs the signal into the lens 10. As described previously, the lens 10 is subject to an electromagnetic field, causing alignment of the dipole dopants 16 as shown. Light impinging on the lens 10 is thereby focused into a narrower beam to an optical detector 58. The subject lens can increase light focusing in such an application and also may substitute for short fiber optical bundles. FIG. 6 shows a communication system in which light 66 is focused prior to entry into fiberoptic fiber bundle 68 toward detector 70.

Figure 5:
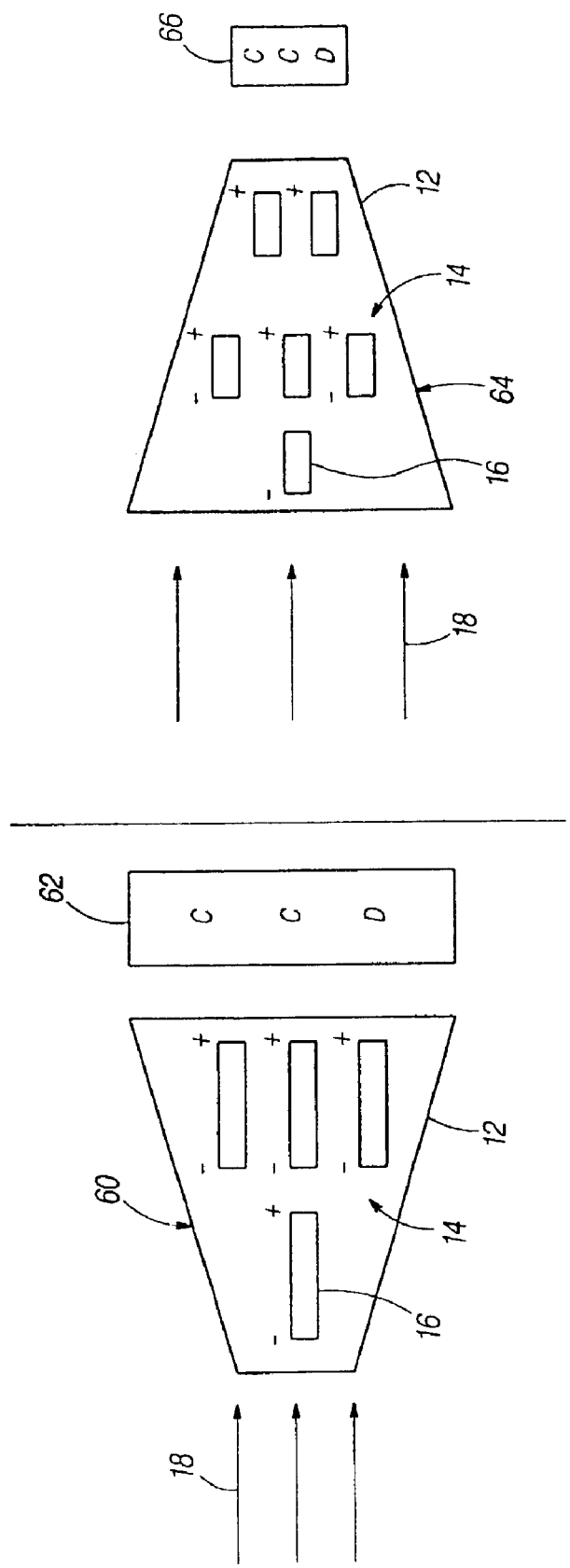
FIG. 5 is a schematic diagram of the subject lens in magnification and demagnification configurations.

The electromagnetic lens 10, as will be appreciated from FIG. 5, can have any geometry. A magnification geometry 60 is shown by which an image, represented by input light 18, is magnified by the dipole moments created by dopants 16 toward a recording device such as a CCD camera 62. The lens may further be configured in a demagnification geometry by which an image, represented by input light 18, is demagnified by lens geometry 64 and directed to a CCD camera or other optical recording device.

In a general sense, the subject invention therefore represents a new class of light processors and optical guiding structures for light wave applications. The gas cell 10 can be operated at low or high pressure, with or without applied electric field, dopants, or gas mixtures if so desired. Optimization of the functions of the subject gas cell, however, will be achieved by utilizing polarization techniques, autobalanced or teterodyne deflection techniques or any of the suitable electrooptical methods.

If no applied field is utilized, the gas cell 10 operates in the passive mode. If an electric field is used, the gas cell operates in the active mode. The operation parameters of the gas cell 10 may be adjusted so as to achieve a desired optical effect. By way of example, by increasing the gas pressure within the cell 10, the detected signal amplitude and beam profile will be improved due to the index of refraction change, as will forward light scattering enhancement. Heavy or high index of refraction gases or gas mixtures are preferable. It is well known that there is a variation of the index of refraction with pressure and temperature, according to the formula:

$$n_{gpr} - 1 = (n_0 - 1)/(1 + \alpha t) + P/760$$

where, $n_{gpr}$ is the index or refraction of the gas medium operating at a certain pressure;

$n_0$ is the index of refraction of the gas operating at 0 C. at 1 atm (760 mm Hg);

$\alpha$ is the coefficient of thermal expansion of gas; and p is the pressure in mmHg. In addition, an adjustable Brewster angle can be obtained at the gas-optical window interface, for example with polarization optics, generally indicated at F in FIG. 2, so that polarization of the emitter light beam may be controlled according to the formula:

$$n_2 \cos \Theta_{B1} = n_1 \cos \Theta_t \text{ and } n_2 \cos \Theta_t = n_1 \cos \Theta_B$$

where the $n_1$ and $n_2$ represent two different refraction media indexes.

The proposed technology can be utilized to modulate, amplify, process, shape, focus, direct, route, or switch, the incident light beam by the performance of a number of functions such as:

light beam shaping, namely to improve signal timing characteristics, signal bandwidth, signal frequency response, and amplitude;

switching, namely to be utilized for switching or light valve capabilities applications;

through linear or non-linear gas-light interaction mechanisms;

light lenses introducing magnification, according to the formula:

$$m = [1 - (\Delta f/f) \pm 2 - (\Delta f/f)/[1 + (\Delta f/f)]$$

where $\Delta f$ is the focal length change of the focal length f due to the index of refraction change; and control the polarizaiton of the emitted light by adjusting the Brewster angle.

Optimization of the above functions will be achieved by utilizing polarimetric techniques, autobalanced or teterodyne deflection techniques or any of the suitable electrooptical methods.

The use or addition of polar molecules into the gas medium in conjunction with the applied electric field enhances the above-mentioned functions of the gas cell proposed technology due to the polar enhancement characteristics of the gas medium, that is, the local electric field improvement).

The subject gas lens is useful in a myriad of applications. Among those that will apparent to those skilled in the art are optical communications; namely, to modulate, amplify, process, shape, focus, direct, route, or switch, the incident beam, in conjunction or not with air, optical fibers, optical guiding structures, multiplexing/demultiplexing systems, optical integrated circuits, and devices.

Another potential application is in the development of optical fibers filled with heavy/high index of refraction gases/gas mixtures, with impurities or dopants.

FIG. 6 shows such a structure in which an optical bundle of hollow capillary tubes receive an incident light beam. The tubes comprise optical fibers filled with gas mixtures, dopants, and/or impurities. In such an application, conditions of total internal reflection and better light propagation and enhanced signal characteristics may be achieved at conditions where $n_1$ (index of refraction of the gas) is larger than $n_2$ (index of refraction of the cladding). Specifically, the addition of different impurities, dopants, and/or gas mixtures in the gas medium and/or closing optical windows made of different materials, used with or without coatings, gives rise to different indexes of refraction. In addition, by utilizing optical fibers with high-pressure noble gases, pulse compression, due to fast third order nonphenomena can arise. This can be very useful in high-power laser applications. Interestingly enough, gas-filled hollow fibers offer the advantages of fast third-order nonlinear mechanisms (such as pulse compression), which can be controlled by changing gas composition and density, as well, physical parameters such as pressure and temperature. Therefore, light will propagate through in a well confined manner, with increased signal-to-noise characteristics, and with minimal dispersion. By varying the gas pressure temperature, or doping gas concentration and composition of the gas filled fiber, a variable index of refraction would be achieved and optimization of the optical system would result.

In addition, an adjustable Brewster angle can be obtained to control the polarization of an emitter light beam.

Space research and military applications, including airspace, warfare, and laser remote systems, may also find the subject light processing technology useful by allowing the introduction of light-weight optical structures capable of handling high power laser sources. Again, as discussed above, optimization of the above functions will be achieved by utilizing polarimetric techniques, autobalanced or heterodyne deflection techniques or any of the suitable electrooptical methods.

A further useful application of the subject light processor structures is in imaging systems. In conjunction with CCD cameras, optical fiber-guided/coupling devices, and lenses, the subject gas cell may be utilized to modulate, amplify, process, shape, focus, direct, route, or switch the incident light beam and/or the light beam carrying image information.

Still a further use of the invention as set forth herein is in industrial applications such as the development of components, industrial devices, sensor systems, and techniques that utilize lightwave operation principles.

While the above sets forth an embodiment of the subject invention and applications for the use thereof, the invention is not intended to be so limited. Other embodiments and other applications, that will be apparent to those skilled in the art, and that utilize the teachings herein set forth, are intended to be within the scope and spirit of the invention.

In light of the foregoing, it should thus be evident that the process of the present invention, providing a photonic processor and optical guiding structure for lightwave applications, systems, and techniques substantially improves the art. While, in accordance with the patent statutes, only the preferred embodiments of the present invention have been described in detail hereinabove, the present invention is not to be limited thereto or scope of the invention shall include all modifications and variations cope of the attached claims.

What is claimed is:

1. A light processing cell for lightwave applications comprising:

at least one gas medium;

an enclosure for containment of the gas medium, the enclosure allowing the light transmission through the gas medium;

polar molecules contained by the enclosure and comprising electric dipoles that align to the direction of an electric field applied to the cell, the polar molecules contributing to the local electric field and effective dielectric constant of the cell and reflect focusing of light transmitted through the cell.

2. A light processing cell as set forth in claim 1, wherein the gas medium is composed in part by a polar gas.

3. A light processing cell as set forth in claim 1, wherein the polar molecules comprise polar dopants dispersed within the gas medium.

4. A light processing cell as set forth in claim 1, wherein the gas medium of the cell has an index of refraction and the pressure of the gas medium within the cell is variable to adjust the index of refraction of the cell.

5. A light processor for lightwave applications comprising:

a cell comprising an enclosure substantially transparent to light;

a medium contained by the enclosure and substantially transparent to light;

polar dopants dispersed within the medium, the dopants comprising electric dipoles that align to the direction of an applied electric field across the cell.

6. A light processor as set forth in claim 5, wherein the medium is a gas medium.

7. A light processor as set forth in claim 6, wherein the pressure of the gas medium is variable to effect a change in the gas medium index of refraction.

8. A light processor as set forth in claim 5, wherein the polar dopants contribute to the local electric field and effective dielectric constant of the cell and effect focusing of light transmitted through the cell.

9. A light processor system comprising: a cell comprising an enclosure substantially transparent to light;

a medium contained by the enclosure and composed of a material substantially transparent to light;

means for applying an electric field across the cell;

polar dopants dispersed within the medium, the dopants comprising electric dipoles that align to the direction of an applied electric field across the cell.

10. A light processor as set forth in claim 9, wherein the medium is composed of at least one gas.

11. A light processor as set forth in claim 10, wherein the pressure of the gas medium is variable to effect a change in the gas medium index of refraction.

12. A light processor as set forth in claim 9, wherein the polar dopants contribute to the local electric field and effective dielectric constant of the cell and focus light transmitted through the cell.

13. A method of processing light for lightwave applications, comprising the steps:

interposing a gas cell in a path followed by the light, the cell having an enclosure composed of substantially transparent material, a gas medium contained within the enclosure, and polar molecules dispersed within the gas medium;

applying an electric field across the gas cell;

aligning the polar molecules to the direction of the applied electric field to contribute to an effective dielectric constant.

14. A method of processing light as set forth in claim 13, further comprising the step of varying the index of refraction of the gas medium by changing the pressure of the gas medium.

* * * * *